March 31, 1970 A. J. HOLM 3,503,425
CURB, SIDEWALK AND CONDUIT STRUCTURE
Filed May 12, 1967 7 Sheets-Sheet 4
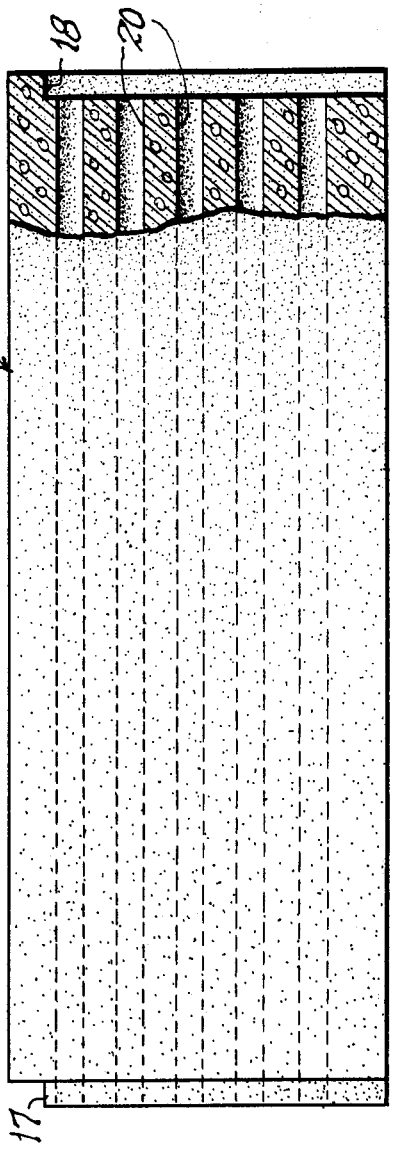
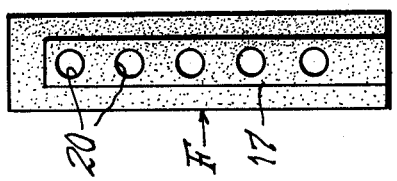
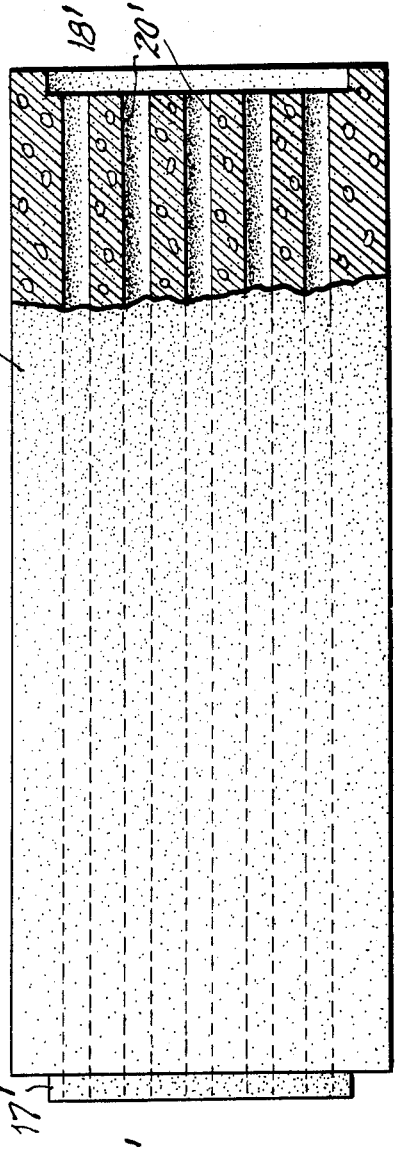
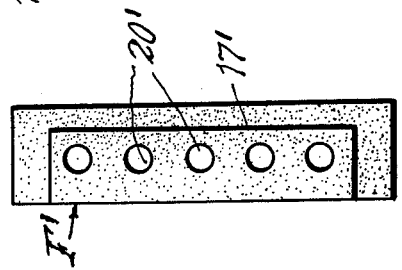
INVENTOR.
Alfred J. Holm
BY
ATTORNEY

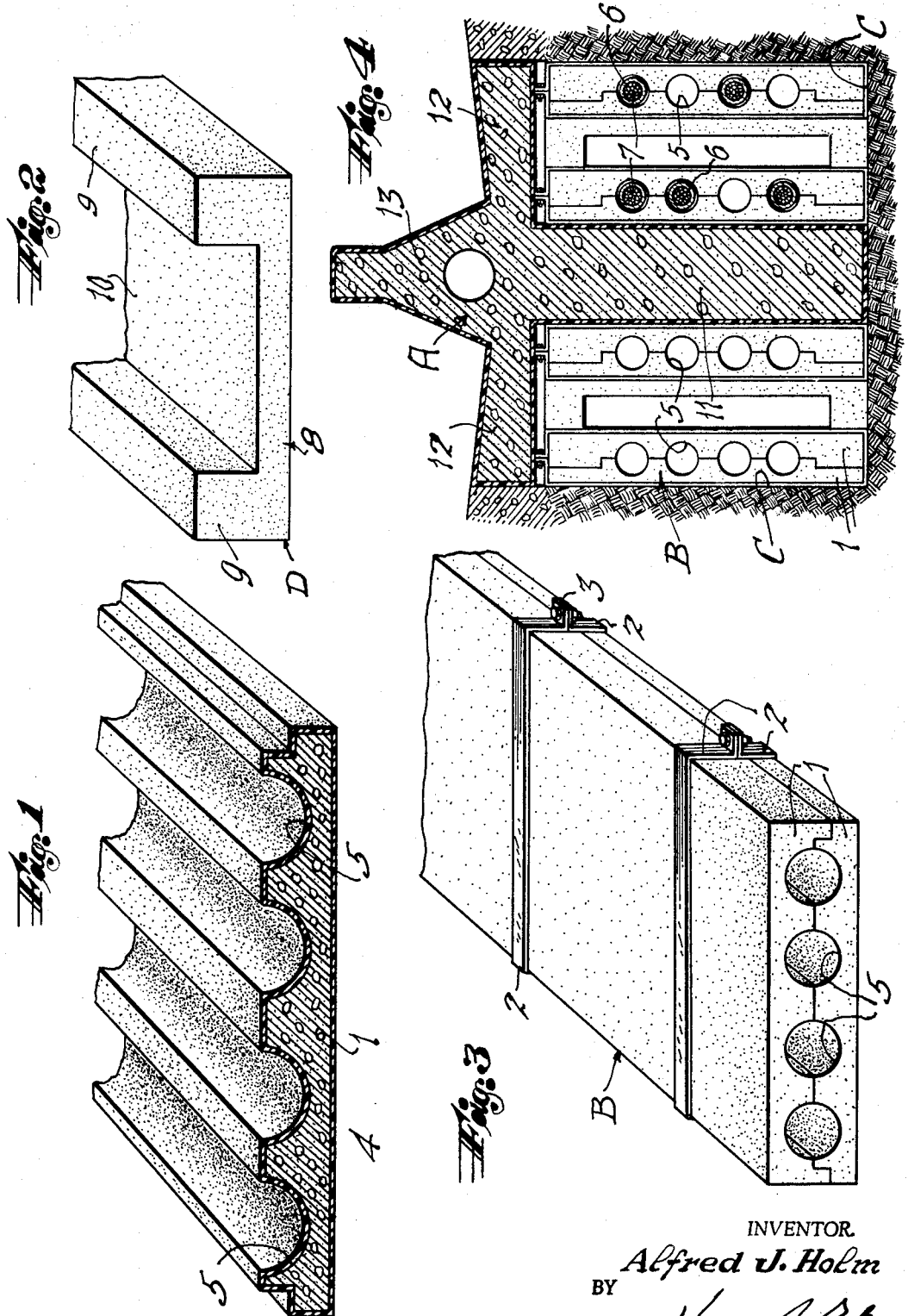

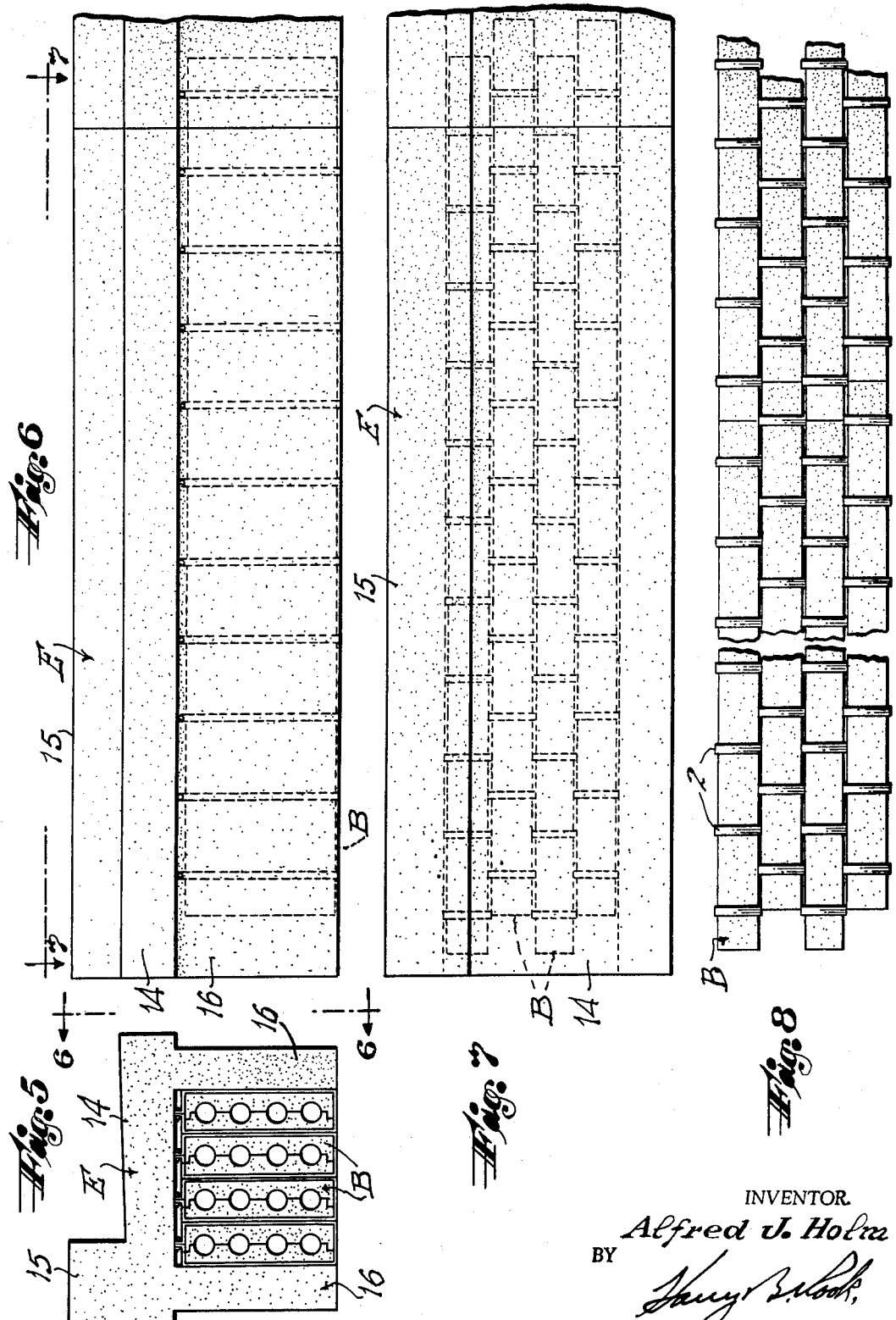

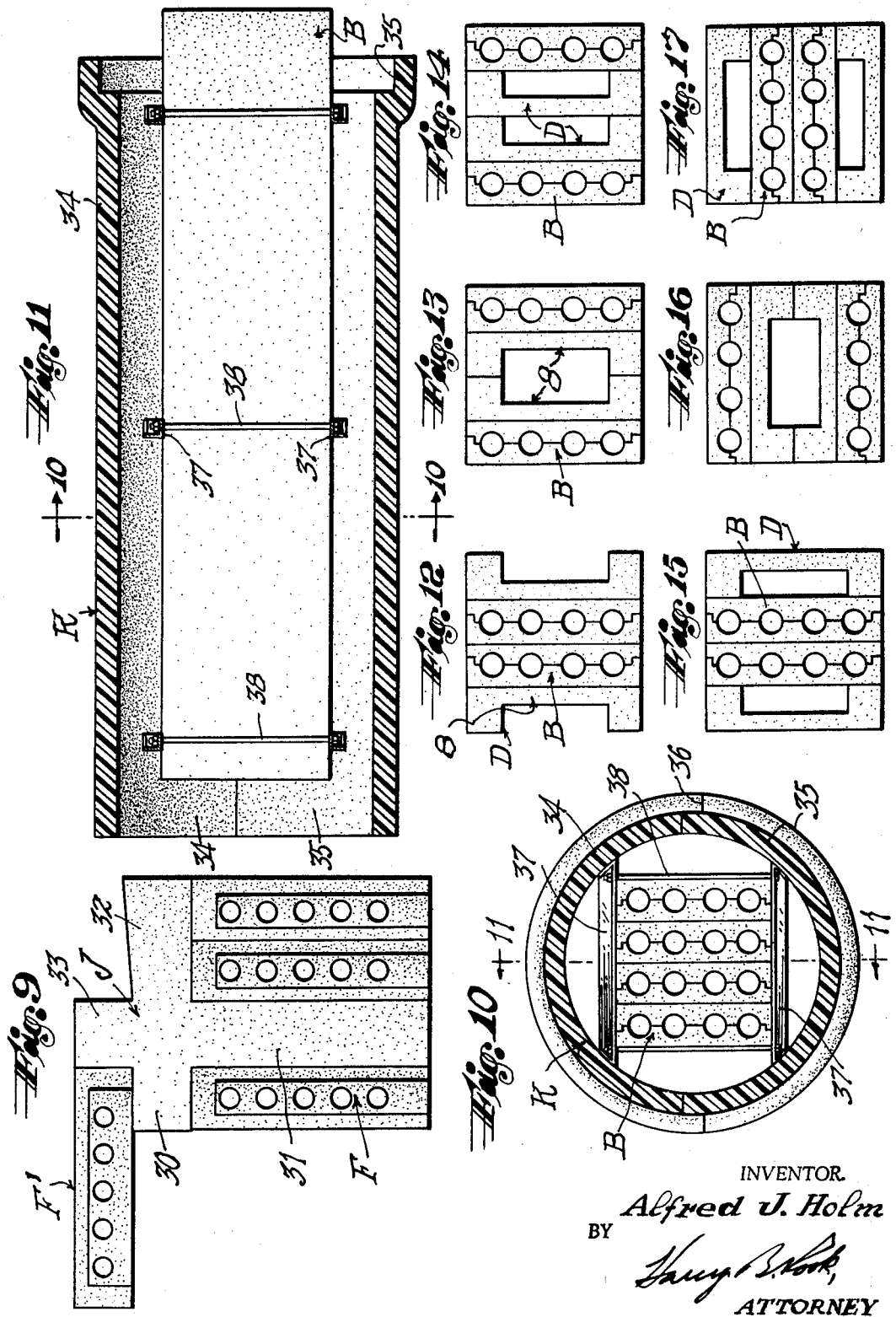

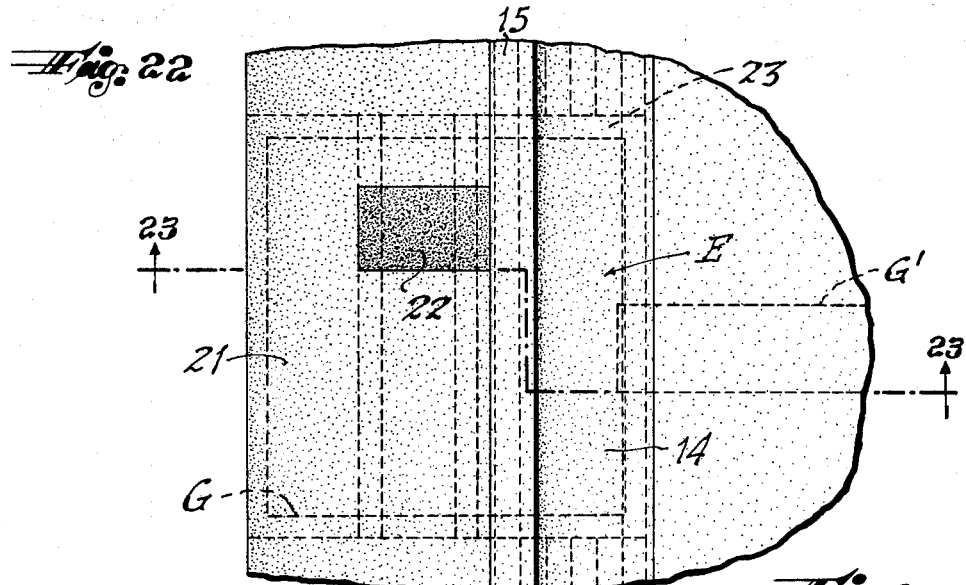
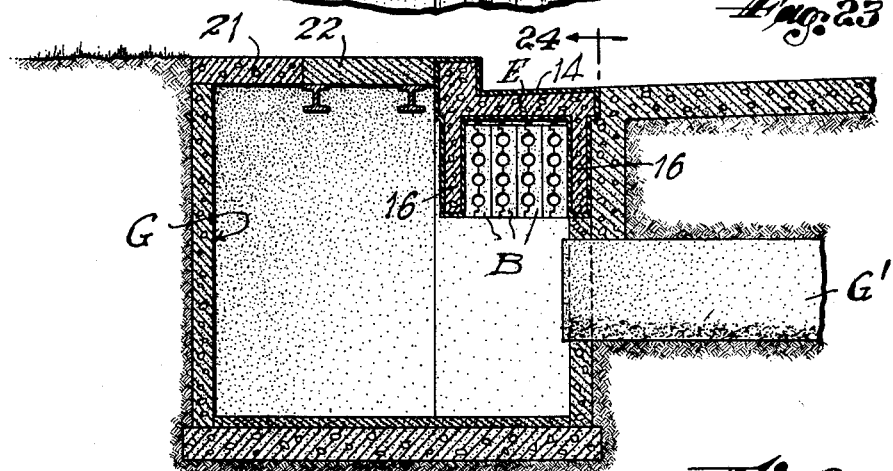
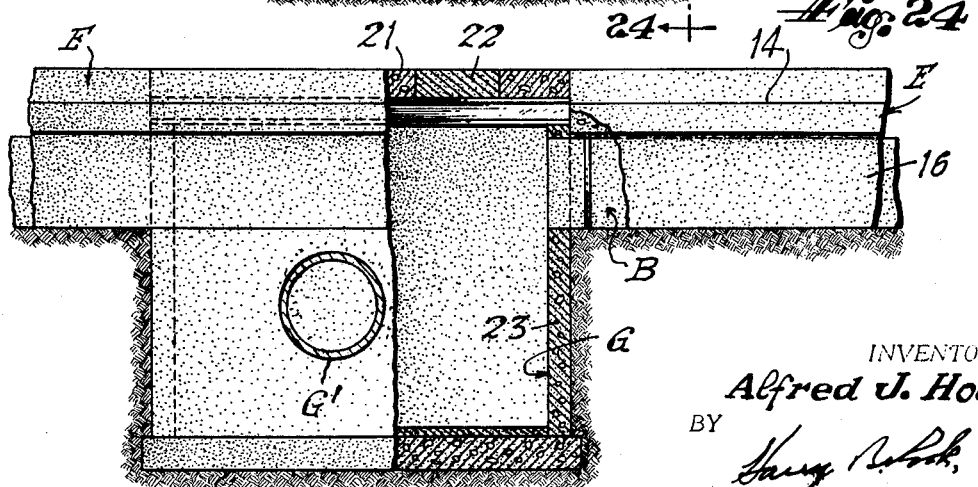

March 31, 1970   A. J. HOLM   3,503,425
CURB, SIDEWALK AND CONDUIT STRUCTURE
Filed May 12, 1967   7 Sheets-Sheet 6
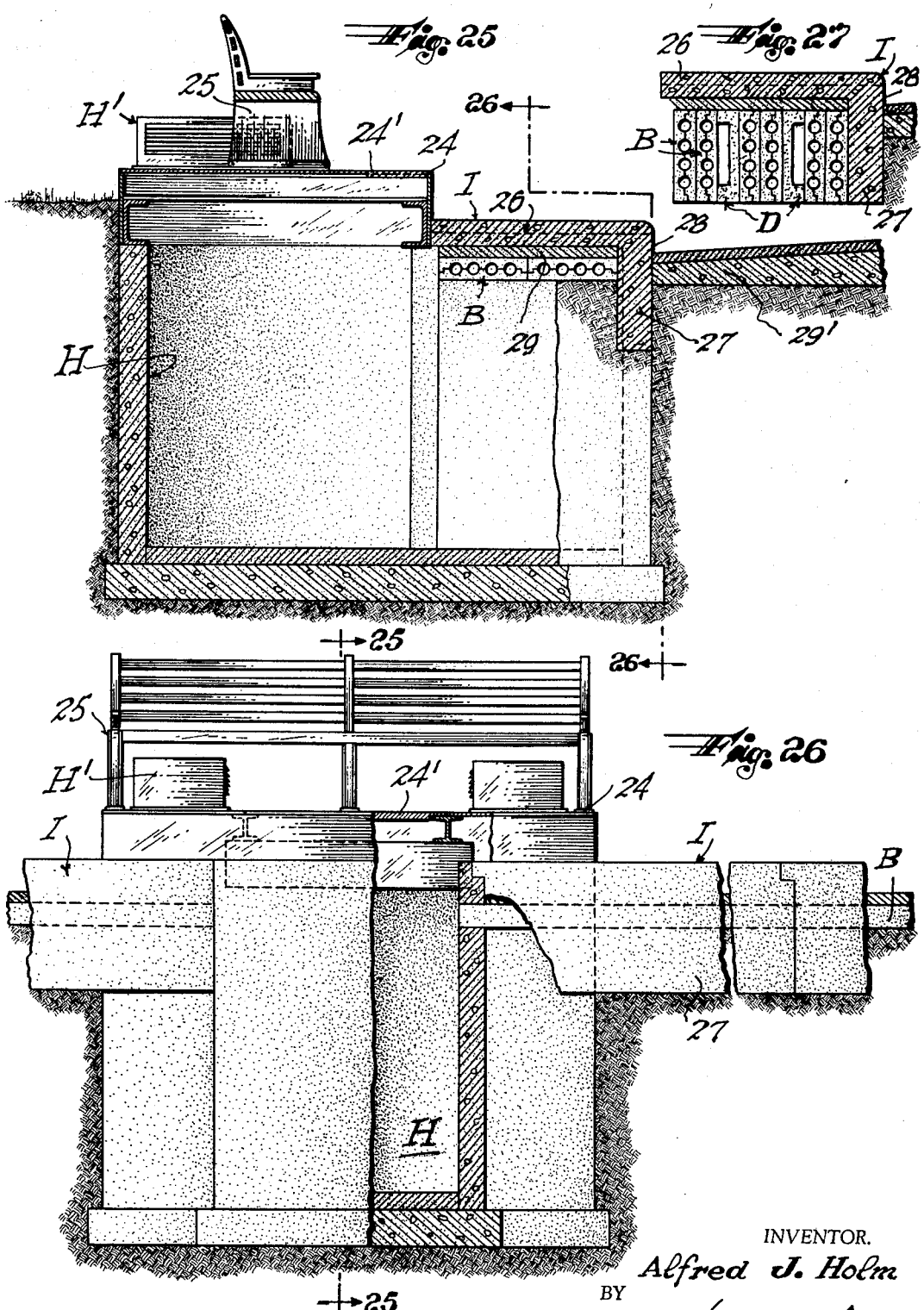
INVENTOR.
Alfred J. Holm
BY
ATTORNEY

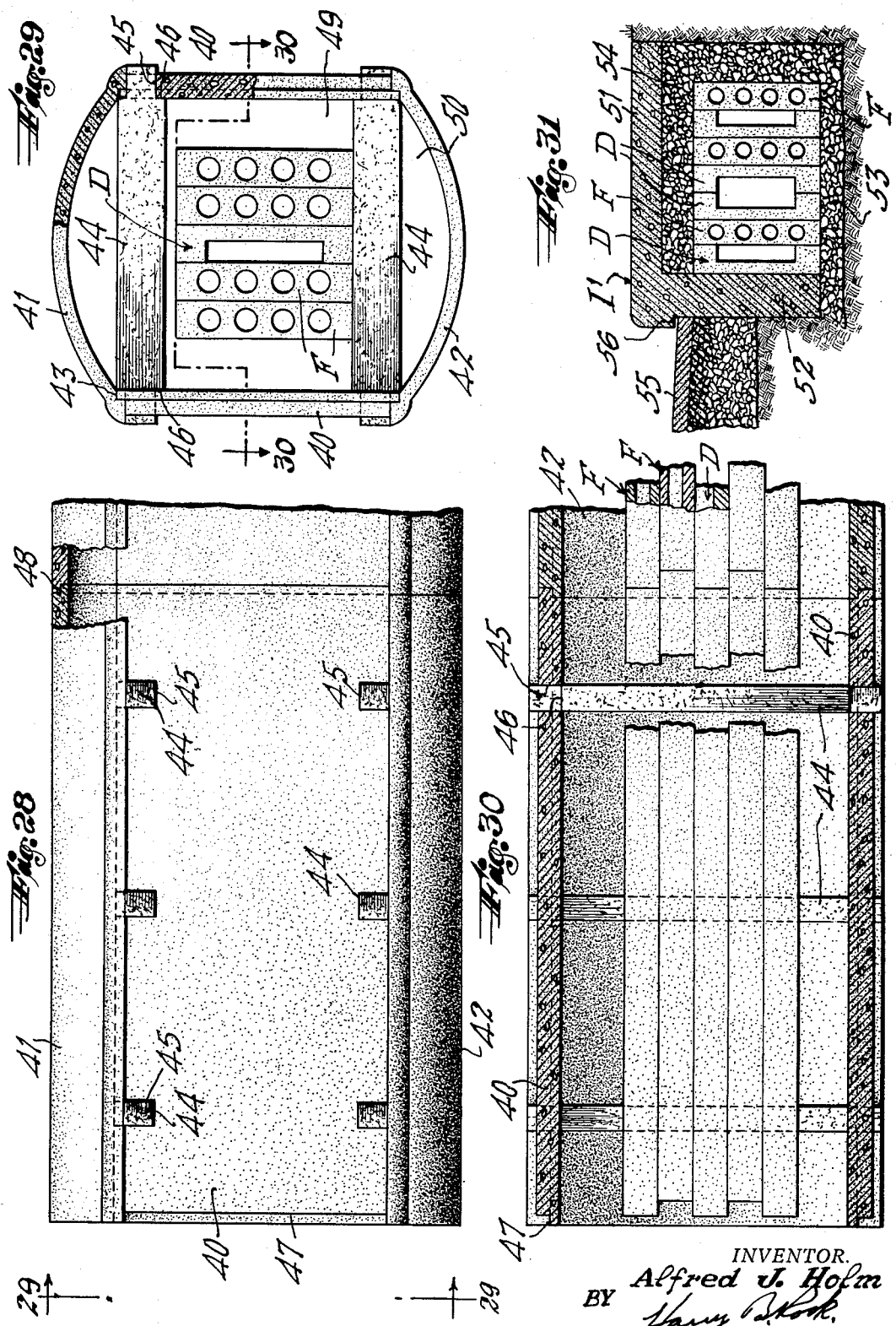

United States Patent Office 3,503,425
Patented Mar. 31, 1970

3,503,425
CURB, SIDEWALK AND CONDUIT STRUCTURE
Alfred J. Holm, 266 U.S. Highway 206
Stanhope, N.J. 07874
Filed May 12, 1967, Ser. No. 637,951
Int. Cl. F16l 9/08, 9/22; E01c 11/22
U.S. Cl. 138—108      3 Claims

ABSTRACT OF THE DISCLOSURE

A combination of conduit sections, molded or cast either in one piece or in two parts, with longitudinal openings therethrough for electrical cables, tubes and the like, and cover sections molded or cast in the form of a curb, or a combined curb and sidewalk unit, or a road divider, or a hollow multiple part concrete or tile pipe, the conduit sections being laid side-by-side for easy installation and replacement in vertical directions and the cover sections being applied over and removable from the conduit sections by vertical movement for easy and quick access to the conduit sections and for repair or replacement of the conduit and cover sections.

Background of the invention

The invention relates in general to conduits for electric cables, wires, pipes and the like for use in roadways or in crossing streams. It is known in the art to mold or cast conduit sections having portions thereof serving as a street curb, for example as shown in Patent No. 889,524, and molded concrete conduit sections have been enclosed in cast metal casings as shown in Patent No. 367,768.

Summary

The invention contemplates a novel and improved construction and combination of conduit sections with or without combined ventilator and spacer sections therefor each molded or cast in one piece or in sections, and a molded or cast cover for said sections which serves as a curb or a combined curb and sidewalk or a curb, sidewalk and vault cover whereby the conduit sections and covers can be easily and quickly installed and the covers can be easily removed from the conduit sections and the conduit sections can be easily separated and replaced by vertical movement.

The covers are produced also in the form of road dividers or as sectional hollow pipes, for example where the wires or cables transverse a stream of water.

Brief description of the figures

FIGURE 1 is a fragmentary sectional perspective view of a part of a conduit section constructed in accordance with the invention;

FIGURE 2 is a similar view of one of the spacer and ventilator sections;

FIGURE 3 is a fragmentary perspective view of one of the conduit sections formed in two parts;

FIGURE 4 is a transverse sectional view of a road divider comprising an assembly of the conduit sections and spacers and a cover therefor;

FIGURE 5 is a view similar to FIGURE 4 showing a combination of the conduit sections and a cover in the form of a sidewalk curb;

FIGURE 6 is an elevational view of the structure shown in FIGURE 5 viewed from the plane of the line 6—6 of FIGURE 5;

FIGURE 7 is a plan view taken from the plane of the line 7—7 of FIGURE 6;

FIGURE 8 is a detached elevational view of the conduit sections removed from the cover;

FIGURE 9 is a view similar to FIGURE 5 showing another form of combined sidewalk curb and sidewalk;

FIGURE 10 is a transverse sectional view through a form of the invention wherein the cover is a sectional pipe;

FIGURE 11 is a combined sectional and elevational view on the plane of the line 11—11 of FIGURE 10;

FIGURE 12 is a schematic end elevational view of one assembly of conduit sections and spacers;

FIGURES 13, 14, 15, 16 and 17 are similar views of other combinations or arrangements of the conduit and spacer and ventilator sections;

FIGURE 18 is an end elevational view of one piece conduit section;

FIGURE 19 is a front elevational view of the conduit section with portions shown in cross section;

FIGURES 20 and 21 are views similar to FIGURES 18 and 19 showing combined sidewalk and conduit section;

FIGURE 22 is a plan view showing combined conduit sections and covers of the type shown in FIGURE 5 installed and associated with a manhole or vault;

FIGURE 23 is a transverse vertical sectional view on the plane of the line 23—23 of FIGURE 22;

FIGURE 24 is a sectional view on the plane of the line 24—24 of FIGURE 23 with portions broken away for clearness of illustration;

FIGURE 25 is a view similar to FIGURE 22 showing another form of the combined conduit sections, cover and manhole or vault;

FIGURE 26 is a sectional view on the plane of the line 26—26 of FIGURE 25 with portions broken away;

FIGURE 27 is a fragmentary sectional view showing a modification of the arrangement of the conduit sections and a combined sidewalk curb cover;

FIGURE 28 is a side elevational view of the modification of the invention which is specifically designed for the laying of high tension cables, for example over or through hills;

FIGURE 29 is an end elevational view of the construction shown in FIGURE 28 from the plane of the line 29—29 of FIGURE 28, with portions broken away and shown in section;

FIGURE 30 is a horizontal sectional view on the plane of the line 30—30 of FIGURE 29, and FIGURE 31 is a fragmentary transverse sectional view through a modified combination of a combined sidewalk and curb cover section, conduit sections and spacer and ventilator sections.

The conduit sections may be formed either in two parts as shown in FIGURES 1 and 3, or in one piece as shown in FIGURES 9 and 18–21. The two-piece conduit section includes two parts 1 which may be identical and are molded or cast of a suitable material such as concrete. The two sections can be secured together in abutting relation to each other in any suitable way, for example by straps 2 the ends of which are connected by bolts 3. The sections may be coated with a layer 4 of water-proof material such as a bithumastic paint or an asphaltic composition and each part may be formed with longitudinal grooves 5 which complement the grooves of the other part when the parts are secured together to provide openings for electric cables and the like. The invention also contemplates the use of tubes 6 for the cables 7, for example paper tubes impregnated with a water-proof material, in the openings of the conduit sections as best shown in FIGURE 4.

The combined spacers and ventilator sections D are shown as comprising molded sections 8 that are channel-shaped in cross section having two parallel longitudinal flanges 9 projecting perpendicularly from a base or main web 10.

FIGURE 4 shows an assembly of the conduit sections, spacer sections and a cover installed in a roadway. The cover section A is shown as comprising a molded body 11 having parallel side surfaces and from which project longitudinal flanges or wings 12 at opposite sides of the body. Between the wings is an upstanding rail portion 13. The cover section is installed at the center of a roadway so that the rail 13 serves as a road divided and the wings 12 form with the rail, channels at the bases of the rails that serve as gutters. Beneath the wings the plurality of the conduit sections B are disposed at opposite sides of the body 11 in a trench or trough C formed in the earth, and desirably the spacer sections D are interposed between the conduit sections to provide channels for the circulation of air for either removing heat from the conduit sections and electric cables therein or for applying heat, for example to remove moisture from the assembly.

In FIGURE 5 the cover section E includes a horizontal portion 14 and an upstanding flange 15 that together form a curb and gutter. Depending from the portion 14 are spaced vertical flanges 16 between which the conduit sections B are assembled.

The conduit sections are arranged in end to end relation along a roadway or trench with their ends in abutting and preferably interlocked relation. The conduit sections may also be formed of two pieces as shown in FIGURE 4 or in one piece as shown in FIGURES 18 and 19 and for interlocking the sections at their ends, each section may be formed at one end with a tenon or projection 17 and at its other end a recess 18 to receive the tenon or projection of an abutting section. One-piece sections F have the cable openings 20 molded therein and extending therethrough. The sections may be coated with a waterproof substance and in some cases water-proof lining tubes may be inserted in the openings 20.

In laying the conduit sections it is desirable that the joints between the abutting sections be staggered and this staggering also provides clearance for the straps 2 as shown in FIGURES 6, 7 and 8.

It is desirable to provide at points appropriately spaced along the installation of conduit sections and cover sections, a manhole or vault or other means of access to the conduit sections for inspection and for installation and repair of cables or tubes. FIGURES 22–24 show such a construction wherein the combination of the cover sections and the conduit sections are the same as those shown in FIGURES 5 and 6. The cover sections E form a part of the top wall of a manhole or vault G the other portion 21 of which may be provided by the sidewalk that has a removable closure plate 22 for access to the manhole or vault. The conduit sections lead through and are interrupted at the end walls 23 of the manhole or vault and are exposed in the manhole or vault as shown in FIGURE 23, one or more of the combined spacer and ventilator sections may be included and a fan or other means for circulating air through the channel formed by the spacer section could be located in the manhole. Also a pipe G' may extend beneath a street or roadway and have its ends connected to vaults at opposite sides of a street or roadway so that electrical cables can be passed therethrough; and in the pipe may be arranged conduit and spacer sections like those above-described. In some cases it may be desirable to break away a portion of one of the flanges 16 of the cover section to permit easier access to the ends of the conduit sections.

FIGURES 25 and 26 show a modification wherein the top 24 of the manhole or vault H also provides a bench 25, for example at a bus station and the cover section I is L-shaped in cross section and includes a main portion 26 which serves as a sidewalk, and a flange portion 27 perpendicular to the portion 26 a part 28 of which serves as a curb against which the roadway 29 abuts. In this construction, the cover sections I also serve as a part of the top wall of the manhole or vault. Here the conduit sections B are laid horizontally in edge to edge abutting relation beneath and parallel to the sidewalk portion 26 of the cover sections; and preferably a layer of suitable cushioning material such as sand 29 is laid between the sidewalk portion 26 and the conduit sections to compensate and for expansion and contraction of the parts. Suitable vents H' are provided and may be partially protected by the bench which is mounted on the top 24 so that it can be quickly removed or tilted and thereby provide a clearance for entry of a workman into the vault through an opening that is normally closed by a slide plate 24'.

FIGURE 27 shows the conduit sections B arranged in side by side abutting relation instead of in edge to edge relation as shown in FIGURE 25. In both combinations shown in FIGURES 25 and 27, the cover sections protect the conduit sections and serve as portions of the sidewalk.

In some instances it may be desirable to utilize the conduit sections as a part of the widewalk as shown in FIGURE 9 where the one-piece sections F' serve as parts of a sidewalk and are supported by a flange 30 projecting from one side of the body 31 of the cover section J which may also have another flange 32 coacting with an upstanding rail portion 33 to form a gutter and a curb. Other conduit sections F are disposed at opposite sides of the body 31 and beneath the flanges 30 and 32.

Another form of the invention is shown in FIGURES 10 and 11 where the cover comprises sections K that may be tile or molded of concrete, each preferably comprising two semi-cylindrical sections 34 and 35 having their longitudinal edges in abutting relation as indicated at 36. A plurality of the conduit sections B are supported within the cover section by a cradle which is shown as comprising cross bars 37 connected by tie rods 38 and whose ends abut or are seated on the interior surface of the cover section.

As shown in FIGURES 10 and 11 the cover section may be in the form of a tube which is particularly desirable where high tension electric wires or cables are to be housed in the conduit sections, and FIGURES 28, 29 and 30 show another form of the invention. Here the tubular cover section is formed of a plurality of complemental parts comprising two vertical and parallel side wall panels 40 preferably formed of reenforced concrete, and top and bottom panels 41 and 42 respectively that are separably joined to the side panels in suitable manner; for example the inner longitudinal edges of the elongated rectangular top and bottom panels may have rabbets 43 in which the edges of the side panels are seated, and the side panels are held in spaced relation to each other by cross bars 44 which have the ends removably seated in notches 45 in the edges of the side wall panels and are provided with shoulders 46 abutting the inner surfaces of the side wall panels. The ends of the cross bars are held in the notches by the longitudinal edges of the top and bottom sections that extend across the open ends of the notches in abutting relation to the ends of the cross bars as best shown in FIGURE 29. Preferably the side wall panels of endwise abutting cover sections have lap joints 47 and the top and bottom panels have similar lap joints 48.

A plurality of the cross bars extend transversely of the tubular cover section in spaced relation to each other and a plurality of the conduit sections B or F are seated on and supported by the lower cross bar so as to provide spaces 49 and 50 between the assembly of conduit sections and the walls of the cover section. Desirably one or more of the spacer and ventilator sections 8 may also be included between adjacent conduit sections as best shown in FIGURE 29. Obviously, if desired, a suitable water-proof sealing agent may be provided in the joints between the complemental parts, and the complemental parts may themselves be coated or impregnated with a water-proofing compound.

One of the important features of the invention is the provision of a cover section that can serve both as a part of a sidewalk and also as a curb. FIGURES 25–27 shown one embodiment of this concept while FIGURE 31 shows another form of the invention. Here the cover section I' has a flat horizontal portion 51 that forms a part of the sidewalk and from which depends an integral flange 52 which serves as a curb. In order to provide for rapid heating and cooling and evaporation of moisture from the assembly, a plurality of the conduit sections B or F are set with their broader sides vertically disposed and their lower narrow sides seated on crushed stone or the like 53. The spacer and ventilator sections D are shown between adjacent conduit sections and between one of the conduit sections and the deep ending flange 52 so as to provide air passages. Desirably a layer of crushed stone 54 is disposed between the horizontal sidewalk portion 51 and the conduit sections and also between the conduit sections and the earth.

An important advantage of this construction is that the cover section can be easily and quickly lifted vertically for quick access to the conduit sections without materially affecting the roadway 55 and the conduit sections and the spacer and ventilator sections can be easily slid upwardly or downwardly for removal or placement.

It is desirable that the flange 52 be provided with a shoulder 56 that overlies the edge of the roadway when the assembly has been installed. This shoulder both facilitates the gripping of the cover section by a hoisting element such as a hook, and also the abutment of the shoulder with the roadway restrains the cover section against settling with respect to the surface of the roadway.

It will be observed that in all forms of the invention the cover sections can be easily lowered over or lifted from the conduit sections which makes easy both installation, replacement and repair of both the cover sections and the conduit sections without materially affecting the usefulness of the roadway. As hereinbefore indicated, the conduit sections and spacer and ventilator sections can be arranged in many different ways to suit different conditions as shown in FIGURES 12 to 17, inclusive; and to this end both the spacer and ventilator sections and conduit sections are made elongated rectangular in plan and elongate rectangular in cross section, and the larger sides of all of the sections are of the same width. Also the channel of the spacer and ventilator section extends longitudinally of the section.

It will be noted that the cover section removably overlies and partially embraces the plurality of conduit sections that are arranged in side by side parallel relation to each other and preferably with their larger sides vertically disposed, as a result of which the cover section can be applied to and removed from the conduit sections either as a unit, e.g. FIGS. 5 and 31, or in parts, e.g. FIGS. 9 and 29, in vertical directions selectively to cover and uncover the sections and access to all of the conduit sections at the same time is made possible when the cover section is removed. Installation, inspection and repair of the structure is relatively simple and inexpensive.

While several embodiments of the invention have been shown and described, it will be understood that this is primarily for the purpose of illustrating the principles of the invention and that many modifications and changes can be made in the structural details within the spirit of the invention and the scope of the appended claims.

I claim:

1. The combination of a plurality of elongated rectangular conduit sections elongate rectangular in cross-section and having longitudinal openings therethrough and disposed in parallel side-by-side relation to each other providing for removal and replacement of any section without movement of the other sections, and a cover section removably overlying and embracing said plurality of conduit sections providing for the application and removal of said cover section in vertical directions selectively to cover and uncover said conduit sections and for access to all of said conduit sections at the same time when said cover section is removed, said cover section comprising a plurality of complemental parts joined together to provide a tube one of which is applicable and removable in vertical directions to cover and uncover said conduit sections, and with the addition of vertically spaced and parallel horizontal cross bars extending transversely of the tube with their ends supported on the walls of the tube, and said conduit sections being seated on the lower cross bar in spaced relation to said parts of the cover section providing passages for air through the tube and around said conduit section.

2. The combination as defined in claim 1 wherein said plurality of parts of the cover section are two complemental semi-cylindrical parts, and said cross bars are connected by tie rods which clamps the conduit sections between the cross bars with the ends of the cross bars seated on the inner surface of the cover section.

3. The combination as defined in claim 1 wherein said plurality of parts of the cover section comprise spaced and parallel rectangular side wall panels, top and bottom panels separably joined to said side wall panels, and said cross bars have their ends removably seated in notches in the upper and lower edges of the side wall panels and overlaid by said top and bottom panels, respectively, said cross bars having shoulders abutting the inner sides of said side wall panels.

References Cited

UNITED STATES PATENTS

| 295,334 | 3/1884 | Berry et al. | 138—117 |
| 367,768 | 8/1887 | Sutton | 94—31 X |
| 506,018 | 10/1893 | Sampson | 94—31 |
| 567,173 | 9/1896 | Schillinger | 94—31 |
| 848,068 | 3/1907 | Thacher | 94—31 X |
| 2,082,429 | 6/1937 | Sterns | 94—31 |
| 2,135,400 | 11/1938 | Johnson | 94—31 X |

FOREIGN PATENTS

| 10,102 | 6/1889 | Great Britain. |
| 9,455 | 5/1905 | Great Britain. |
| 23,808 | 3/1901 | Switzerland. |

JACOB L. NACKENOFF, Primary Examiner

U.S. Cl. X.R.

94—31; 138—117